US007202878B2

(12) United States Patent
Safadi et al.

(10) Patent No.: US 7,202,878 B2
(45) Date of Patent: *Apr. 10, 2007

(54) METHOD AND APPARATUS FOR PRESERVING, ENLARGING AND SUPPLEMENTING IMAGE CONTENT DISPLAYED IN A GRAPHICAL USER INTERFACE

(75) Inventors: Reem Safadi, Horsham, PA (US); Lawrence D. Vince, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/229,929

(22) Filed: Sep. 19, 2005

(65) Prior Publication Data

US 2006/0015901 A1     Jan. 19, 2006

Related U.S. Application Data

(63) Continuation of application No. 09/941,512, filed on Aug. 28, 2001, now Pat. No. 6,958,759.

(51) Int. Cl.
*G09G 5/00*     (2006.01)
(52) U.S. Cl. ............... 345/660; 715/800; 715/810; 725/39
(58) Field of Classification Search ............... None
See application file for complete search history.

(56) References Cited

U.S. PATENT DOCUMENTS

| 4,790,028 | A | * | 12/1988 | Ramage | ............... | 382/298 |
|---|---|---|---|---|---|---|
| 5,754,348 | A | | 5/1998 | Soohoo | | |
| 5,767,919 | A | | 6/1998 | Lee et al. | | |
| 5,793,438 | A | | 8/1998 | Bedard | | |
| 6,025,837 | A | | 2/2000 | Matthews et al. | | |
| 6,163,316 | A | | 12/2000 | Killian | | |
| 6,169,543 | B1 | | 1/2001 | Wehmeyer | | |
| 6,249,290 | B1 | | 6/2001 | Herndon et al. | | |
| 6,396,507 | B1 | | 5/2002 | Kaizuka et al. | | |
| 6,466,203 | B2 | | 10/2002 | Van Ee | | |
| 6,518,986 | B1 | | 2/2003 | Mugura | | |
| 6,526,577 | B1 | | 2/2003 | Knudson et al. | | |

(Continued)

FOREIGN PATENT DOCUMENTS

WO     00/25267     5/2000

(Continued)

*Primary Examiner*—Mark Zimmerman
*Assistant Examiner*—Enrique L. Santiago
(74) *Attorney, Agent, or Firm*—Benjamin D. Driscoll

(57) ABSTRACT

An enlargement feature of a graphical user interface (GUI) is disclosed. When a portion of a digital image displayed in the GUI is selected for enlargement, an enlarged version of the selected portion is displayed adjacent to the remaining portion of the original image that was not selected for enlargement. The digital image may include a plurality of image portions (e.g., individual display windows) selectable for enlargement, such as those found in a CATV electronic programming guide (EPG). In one embodiment, hidden supplemental data corresponding to the selected portion is only revealed in the enlarged version of the selected portion, so that it can be more easily viewed. In another embodiment, an enlargement feature application program is downloaded to a local device that controls the GUI, in response to a subscriber accepting an offer presented by a service provider.

7 Claims, 7 Drawing Sheets

U.S. PATENT DOCUMENTS

| | | |
|---|---|---|
| 6,614,804 B1 | 9/2003 | McFadden et al. |
| 6,657,647 B1 | 12/2003 | Bright |
| 6,700,624 B2 * | 3/2004 | Yun .......................... 348/555 |
| 6,704,028 B2 | 3/2004 | Wugofski |
| 6,745,391 B1 | 6/2004 | Macrae et al. |
| 6,958,759 B2 * | 10/2005 | Safadi et al. ............... 345/660 |
| 2002/0167503 A1 | 11/2002 | Tsunoda et al. |
| 2003/0005453 A1 | 1/2003 | Rodriguez et al. |

FOREIGN PATENT DOCUMENTS

| | | |
|---|---|---|
| WO | 01/52050 | 7/2001 |

* cited by examiner

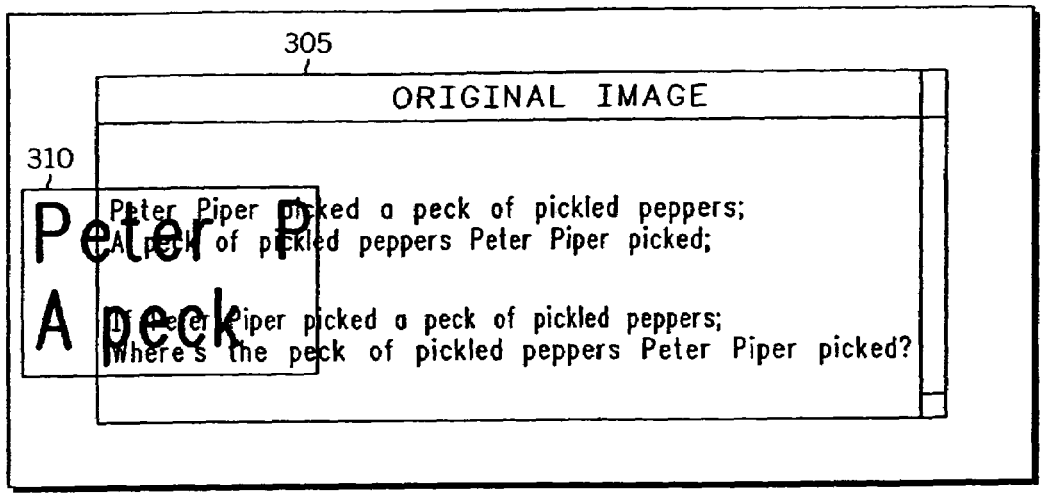
FIG. 3
-PRIOR ART-
300
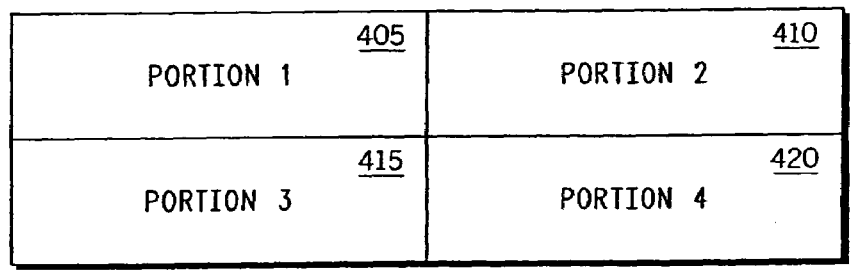
400 FIG. 4
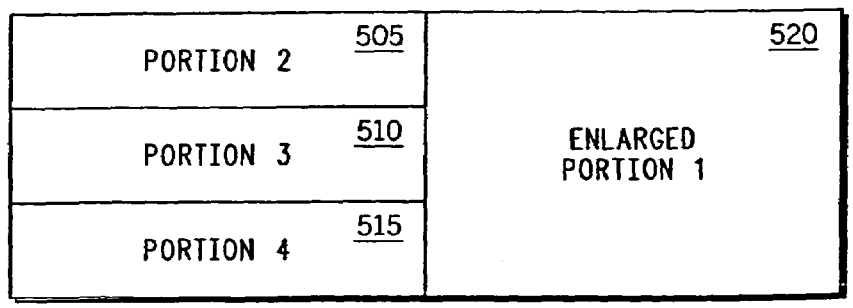
FIG. 5 500

|  | 2:30 PM | 3:00 PM |
|---|---|---|
| ABC | I LOVE LUCY <u>605</u> | THE BEVERLY HILLBILLIES <u>615</u> |
| NBC | BEWITCHED <u>610</u> | THE MUNSTERS <u>620</u> |

FIG. 6 <u>600</u>

| | | |
|---|---|---|
| 2:30 PM NBC | BEWITCHED <u>705</u> | I LOVE LUCY <u>720</u><br><br>EPISODE #27 "THE KLEPTOMANIAC" – RICKY DISCOVERS A LARGE AMOUNT OF CASH IN LUCY'S PURSE. |
| 3:00 PM ABC | THE BEVERLY HILLBILLIES <u>710</u> | |
| 3:00 PM NBC | THE MUNSTERS <u>715</u> | |

2:30 PM ABC

<u>700</u> FIG. 7

| SELECTABLE IMAGE PORTION IDENTIFICATION | DATA DISPLAYED IN SELECTABLE IMAGE PORTION WINDOWS | HIDDEN SUPPLEMENTAL DATA DISPLAYED WHEN CORRESPONDING SELECTABLE IMAGE PORTION WINDOW IS SELECTED FOR ENLARGEMENT |
|---|---|---|
| 1 | I LOVE LUCY | EPISODE #27 "THE KLEPTOMANIAC" – RICKY DISCOVERS A LARGE AMOUNT OF CASH IN LUCY'S PURSE. |
| 2 | THE BEVERLY HILLBILLIES | JED CLAMPETT SELLS HIS SWAMP FULL OF OIL FOR $25 MILLION AND MOVES TO BEVERLY HILLS TO LIVE IN A MANSION. |
| 3 | BEWITCHED | COMEDY, SITUATION, FANTASY, CLASSIC (30 MINUTES) "THE TRUTH, NOTHING BUT THE TRUTH, SO HELP ME, SAM" : ENDORA PUTS A TRUTH SPELL ON SAMANTHA'S UNICORN PIN. |
| 4 | THE MUNSTERS | COMEDY, SITUATION, CLASSIC (30 MINUTES) "THE MUSICIAN" : GRANDPA CREATES A POTION TO GIVE EDDIE MUSICAL TALENT. |

*FIG. 10*

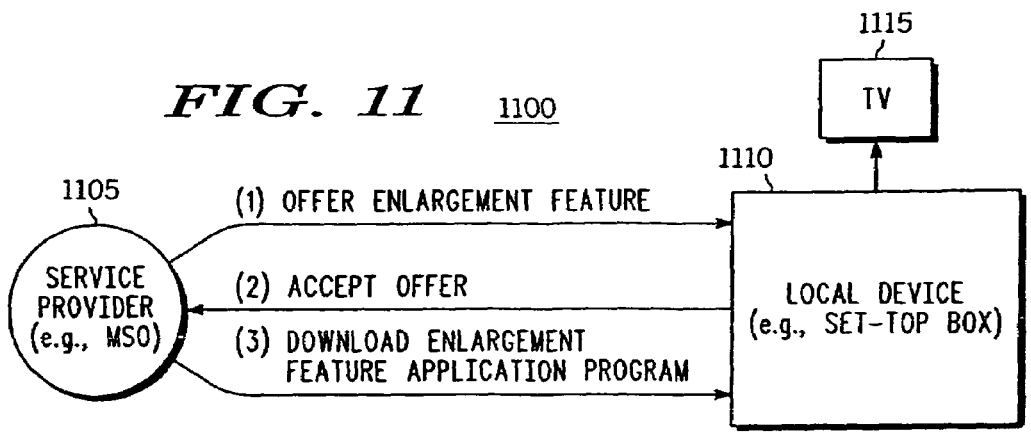

| P1 | P2 | P3 | P4 | P5 |
|---|---|---|---|---|
| P6 | P7 | P8 | P9 | P10 |
| P11 | P12 | P13 | P14 | P15 |
| P16 | P17 | P18 | P19 | P20 |
| P21 | P22 | P23 | P24 | P25 |

1200 (with 1205 pointing to P3)

FIG. 12B

| P1 | P2 | P3 | P4 | P5 |
|---|---|---|---|---|
| P6 | P7 | P8 | P9 | P10 |
| P11 | P12 | P13 | | P14 |
| P16 | P17 | P18 | P19 | P20 |

1200' (with 1205' pointing to P3; P13 enlarged)

FIG. 12C

| P1 | P2 | P3 | P4 | P5 |
|---|---|---|---|---|
| P6 | P7 | P8 | P9 | P10 |
| P11 | P12 | | P13 | P14 |
| P16 | P17 | P18 | P19 | P20 |

1200'' (with 1210 pointing to P2; P12 enlarged)

FIG. 12D

| P6 | P7 | P8 | P9 | P10 |
|---|---|---|---|---|
| P11 | P12 | P13 | P14 | P15 |
| P16 | P17 | | P18 | P19 |
| P21 | P22 | P23 | P24 | P25 |

1200''' (with 1215 pointing to P7; P17 enlarged)

METHOD AND APPARATUS FOR PRESERVING, ENLARGING AND SUPPLEMENTING IMAGE CONTENT DISPLAYED IN A GRAPHICAL USER INTERFACE

This application is a continuation of and claims priority to U.S. patent application Ser. No. 09/941,512, filed on Aug. 28, 2001 now issued U.S. Pat. No. 6,958,759.

BACKGROUND OF THE INVENTION

1. Field of the Invention

The present invention generally relates to a graphical user interface (GUI) for controlling the display of a digital image, and providing GUI features which allow a user to reformat the image so that the user can concentrate on a portion of the image that is of particular interest, while preserving the remaining portion of the image.

2. Background Information

In a CATV system, an electronic program guide (EPG) is used by a viewer to determine what programs are available for viewing on a television, at what time the programs will be broadcast, and on which channels. More sophisticated EPGs display supplemental information used by the viewer to determine whether the program is suitable for young children, what actors are in the program, how long the program is, and what the program is about. Normally in an EPG, an individual windowed portion is allocated for each program displayed.

Viewers of CATV programs use a GUI to navigate an EPG and select program windows in the EPG that are of particular interest. When viewing the EPG at a considerable distance from the television set, it is often difficult for a viewer to discern the text and/or images in the individual windows of the EPG.

U.S. Pat. No. 5,754,348 (Soohoo) discloses magnifying a selected region of an image while simultaneously preserving the continuity and integrity of the original unmagnified image that forms the visual content of the magnified region. Using Soohoo's method, a selected region of an original image is determined, the selected region image data is copied and magnified, and the floating plane region containing the magnified image data is displayed such that it covers an area of the original image that is larger than the selected region. Thus, the use of Soohoo's method obstructs a portion of the original image from being viewed.

FIG. 1 illustrates a prior art system 100 comprising a display 105 showing an original image 110. The original image is shown in text format, but it is understood that any image(s) may be included in the original image.

FIG. 2 illustrates a prior art system 200 comprising a display 220 showing an original image 205. A selected portion 215 of the original image is shown. Prior art system 200 superimposes a magnified image 215 over the original image 205 without modifying the original image 205. There is information in the superimposed magnified image 215 that also appears in the original image 205, which can both be seen simultaneously if the window is not directly superimposed over the selected portion 210.

FIG. 3 illustrates a prior art system 300 having a magnified image 310 superimposed over an original image 305. In this case, a window displaying the magnified image 310 is transparently superimposed over the original image 305 such that both images 305 and 310 may be simultaneously viewed. Magnified image 310 is displayed in a floating plane region in a partially transparent format, so that a portion of the original image covered by the floating plane region can still be viewed. However, in situations where it is desired to enlarge a portion of the original image having a dense concentration of text and/or image data, it would be difficult, if not impossible, to discern what appears behind the floating plane image.

SUMMARY OF THE INVENTION

The present invention includes a method and apparatus for preserving, enlarging and supplementing image content displayed in a graphical user interface (GUI), such as an electronic program guide (EPG), or the like.

The present invention enlarges a digital image displayed in a graphical user interface (GUI). The present invention selects for enlargement a portion of an original image displayed in the GUI and displays, adjacent to an enlarged image of the selected portion, an image of the remaining portion(s) of the original image that was not selected for enlargement. When one of the image portions is selected, the remaining selectable image portion(s) that was not selected is displayed adjacent to an enlarged image of the selected portion. The remaining portion does not include the image data that is displayed by the enlarged image and thus there is no redundancy in the data displayed by the adjacent image portions. Further, the remaining portion is not obscured by the enlarged image, and the enlarged image is not transparently superimposed on the remaining portion.

The present invention displays an enlarged portion of the original image adjacent to a remaining portion of the original image that was not selected for enlargement. The present invention may store image data of the selected portion in a first memory location and store image data of the remaining portion in a second memory location.

The image data of the selected portion is retrieved from the first memory location, the image data of the remaining portion from the second memory location is retrieved from the second memory location, and the retrieved image data is reconfigured such that the remaining portion image is displayed adjacent to an enlarged image of the selected portion, and the GUI is instructed to display a modified image based on the reconfigured image data.

In a first embodiment of the present invention, a table that correlates hidden supplemental data with selected image portion identification data is stored in a third memory location. The present invention may search the third memory location to determine if there is hidden supplemental data that corresponds to the selected portion, incorporate any hidden supplemental data found in the third memory location that corresponds to the selected portion into the enlarged image, and instruct the GUI to display the enlarged image including the hidden supplemental data.

The enlargement feature may be controlled by an infrared (IR) remote control operated by the subscriber. The enlargement feature may be controlled by a wireless pointing device operated by the subscriber. The pointing device may be a mouse having two buttons which, each of which when depressed, implement different features of the present invention. A floating plane region may be superimposed on the original image in the GUI. The floating plane region moves in accordance with a change of the selected portion, and the enlarged image of the selected portion is modified to correspond to the current selected portion.

The present invention also displays an original image having a plurality of image portions selectable for enlargement. When one of the image portions is selected, the selectable image portions that were immediately adjacent to the selected image portion prior to being enlarged are either displayed or hidden, depending on which image portion is selected and how the enlargement of the selected image portion is configured.

The apparatus of the present invention includes a first and second memory location and a processor. The first memory location stores image data of a portion of an original image displayed in the GUI and selected for enlargement. The second memory location stores image data of the remaining portion of the original image that was not selected for enlargement. The processor (i) retrieves the image data of the selected portion from the first memory location, (ii) retrieves the image data of the remaining portion from the second memory location, (iii) reconfigures the image data such that the remaining portion is displayed adjacent to an enlarged image of the selected portion, and (iv) instructs the GUI to display a modified image based on the reconfigured image data. The remaining portion is not obscured by the enlarged image, and the enlarged image is not transparently superimposed on the remaining portion.

In accordance with the first embodiment described above, the apparatus of the present invention includes a first and second memory location, and a processor. The first memory location stores image data of a portion of an original age displayed in the GUI and selected for enlargement. The second memory location stores a table that correlates hidden supplemental data with selected image portion identification data. The processor (i) searches the second memory location to determine if there is hidden supplemental data that corresponds to the selected portion, (ii) incorporates any hidden supplemental data found in the second memory location that corresponds to the selected portion into the enlarged image, and (iii) instructs the GUI to display the enlarged image. The incorporated hidden supplemental data is revealed by the enlarged image.

In a second embodiment of the present invention, a service provider may offer a subscriber access to an enlargement feature of the GUI described above. In response to the subscriber accepting the offer, an enlargement feature application program is downloaded to a local device that controls the GUI. The enlargement feature may be operated in conjunction with an electronic programming guide (EPG) or an integral part of another EPG version. The service provider may be a multiple system cable operator (MSO), and the local device may be a set-top box in communication with a remote server maintained by the MSO and a television.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings:

FIG. 3 shows a prior art GUI display where a magnified image of the selected portion is transparently superimposed on the original image.

FIG. 4 shows an original image prior to a particular portion of the original image being selected for enlargement in accordance with the present invention.

FIG. 5 shows a reconfigured version of the original image with an enlarged image portion displayed adjacent to the remaining portion of the original image that was not selected for enlargement in accordance with the present invention.

FIG. 6 shows an electronic programming guide (EPG) with a plurality of selectable windows, each containing information about different programs in accordance with the present invention.

FIG. 7 shows a reconfigured version of the EPG with an enlarged window containing selected program information displayed adjacent to the remaining program windows that were not selected for enlargement in accordance with the present invention.

FIG. 10 shows a table stored in a memory location used for determining whether hidden supplemental data is to be displayed when a corresponding image portion is selected in accordance with the present invention.

FIG. 11 shows a CATV system that allows a subscriber to add an enlargement feature to a local device used by the subscriber in accordance with the present invention.

FIG. 12A shows an original image with an image portion selected for enlargement.

FIGS. 12B, 12C and 12D show examples of how the image display may appear after particular selectable image portions of an original image are selected for enlargement.

DETAILED DESCRIPTION OF THE INVENTION

Figure 1:
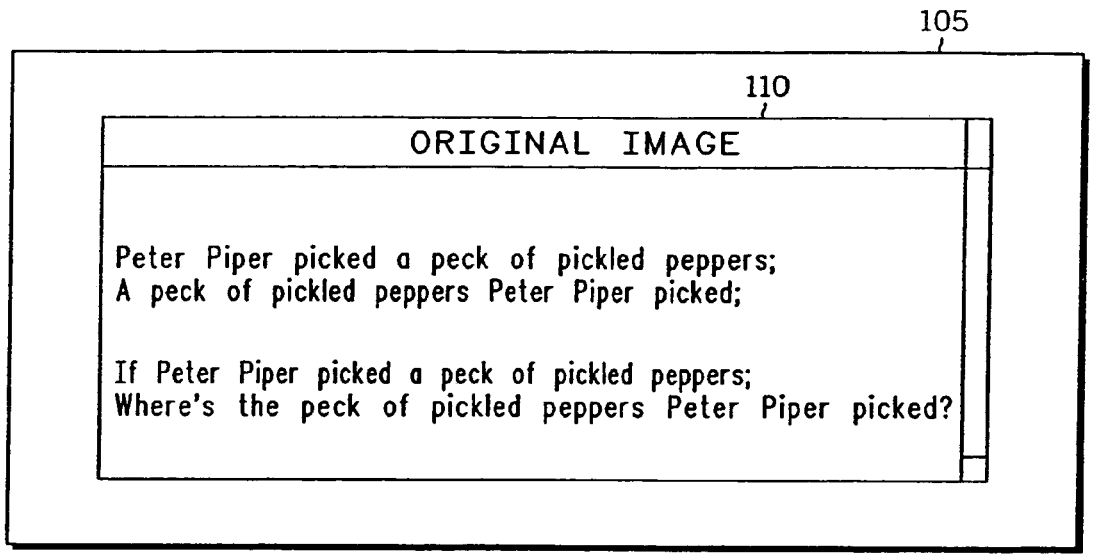
FIG. 1 shows a prior art display of an original image.
Figure 2:
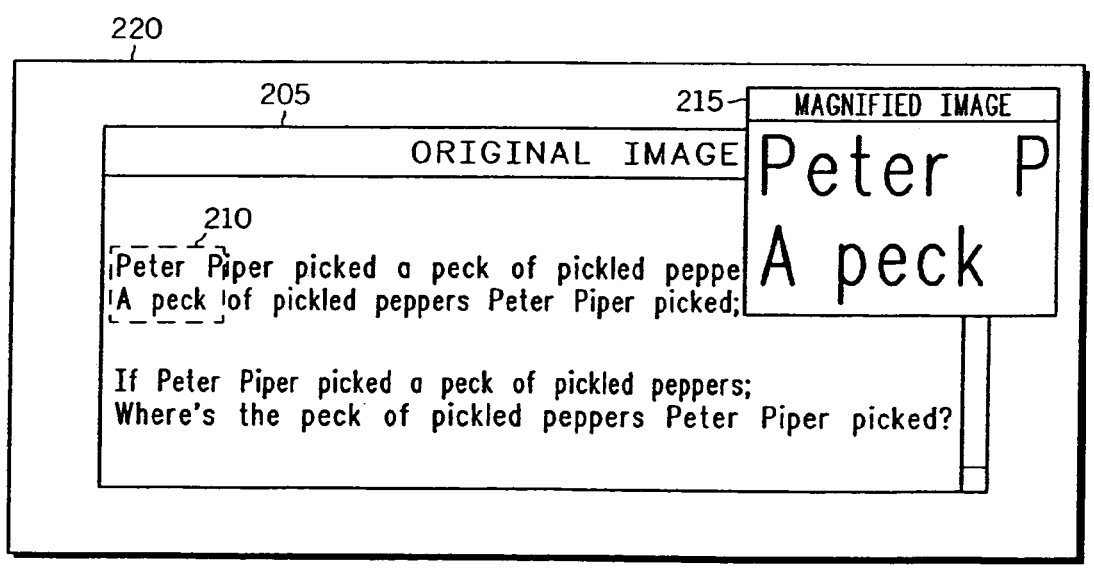
FIG. 2 shows a prior art GUI display where a selected portion of the original image is selected and a magnified image is superimposed on the original image.

The present invention enlarges a selected portion of a displayed image and displays the enlarged selected portion adjacent to the remaining portion of the image that was not enlarged. In order to fit the enlarged image portion and the remaining image portion on the same display screen without any overlapping, the present invention stores and reconfigures image data associated with the selected image portion and the remaining image portion.

FIG. 4 illustrates a GUI display 400 in accordance with the present invention. Included on the GUI display 400 are four substantially equal-sized image portions, a first portion 405, a second portion 410, a third portion 415, and a fourth portion 420. Image data associated with portions 405, 410, 415 and 420 is stored in memory. Once one of the image portions is selected for enlargement, the stored image data is retrieved from memory, reconfigured, and displayed in accordance with the present invention.

FIG. 5 shows a system display 500 after a first portion 520 is selected for enlargement. Note that image portions 505, 510 and 515 may remain the same size or may be reduced in size, depending on the room available on the display. Image portion 520 is enlarged to allow a viewer a clear image while still allowing the viewer to discern the other non-enlarged (or reduced) image portions.

FIG. 6 shows an electronic programming guide (EPG) 600. EPG 600 is shown with four program windows 605, 610, 615 and 620. A television viewer may select a particular program window for enlargement by selecting one of the windows 605, 610, 615 and 620 by utilizing a wireless pointing capability that may be built into an infrared (IR) remote control, wireless mouse, Web pad, or the like.

FIG. 7 shows an EPG 700 after a program window 720 has been selected for enlargement. Program window 720 is displayed adjacent to windows 705, 710 and 715 which were not selected for enlargement. Once enlarged, window 720 is illustrated as displaying additional supplemental data about the program associated with the program window selected.

Figure 8:
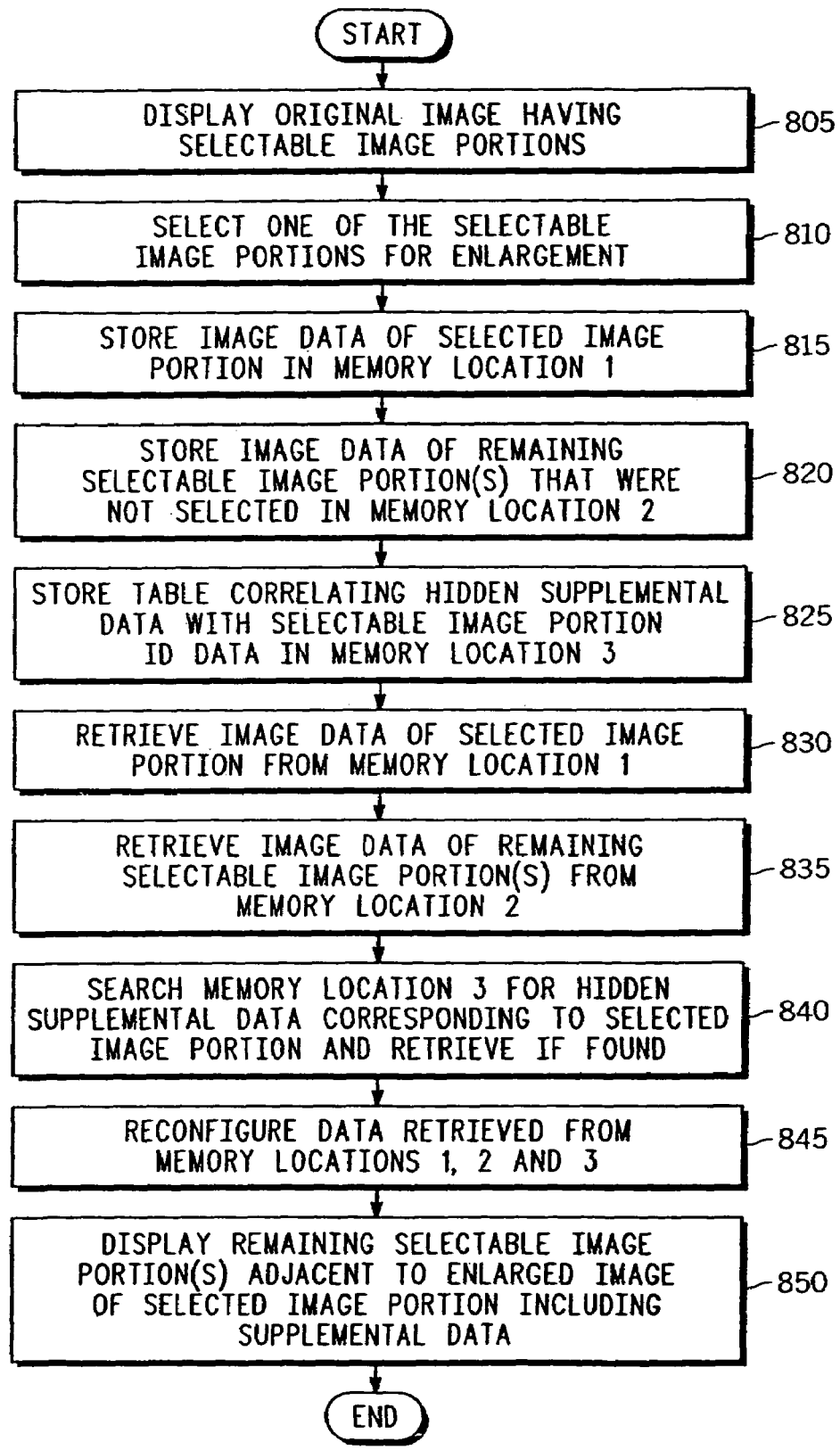
FIG. 8 shows a flow chart in accordance with the present invention.

Referring now to FIG. 8 which represents one of the exemplary embodiments of the present invention, an original image having selectable image portions is displayed (step 805). One of the selectable image portions is selected for enlargement (step 810). Image data associated with the selected image portion is stored in a first memory location (step 815). Image data associated with the remaining selectable image portion(s) is stored in a second memory location (step 820). A table correlating hidden supplemental data with selectable image portion identification data is stored in a third memory location (step 825). Image data associated with the selected image portion is retrieved from the first memory location (step 830). Image data associated with the remaining selectable image portion(s) is retrieved from the second memory location (step 835). A search is performed in the third memory location for hidden supplemental data that corresponds to the selected image portion and is retrieved if found (step 840). The image data retrieved from the first, second and third memories is then reconfigured by a processor (step 845). Finally, the image data associated with the remaining image portion(s) is displayed adjacent to an enlarged image of the selected image portion which includes any hidden supplemental data found in the third memory location (step 850).

The remaining image portion(s) does not include the image data displayed by the enlarged image. The selection of an image portion for enlargement may be implemented by utilizing a wireless pointing capability that may be built into an infrared (IR) remote control, wireless mouse, Web pad, or the like. The display of the enlarged image portion including the hidden supplemental data adjacent to the remaining image portion(s) may then be implemented by depressing a second button on the mouse. As previously discussed, the remaining portion is not obscured by the enlarged image, and the enlarged image is not transparently superimposed on the remaining portion.

Figure 9:
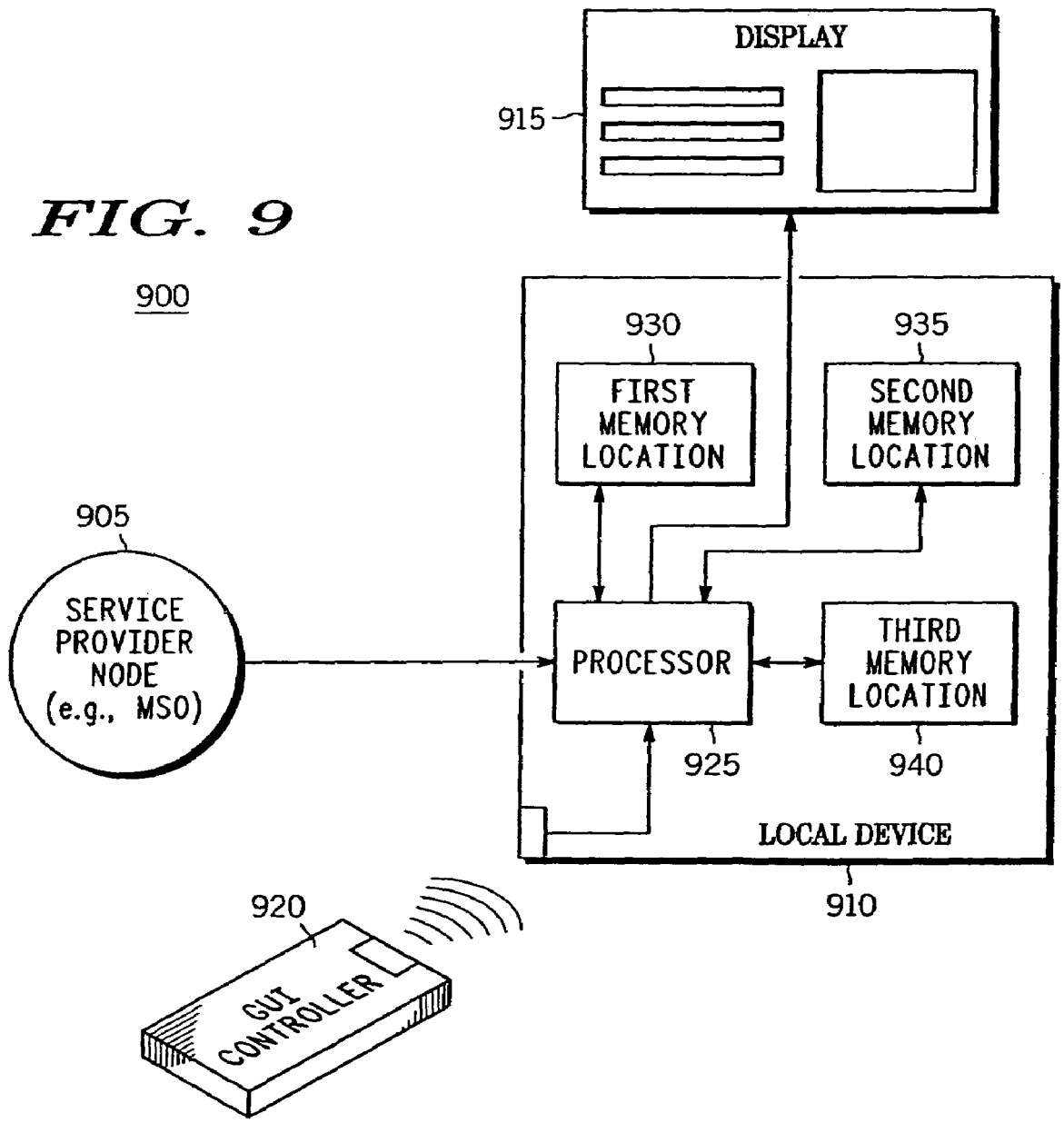
FIG. 9 shows a CATV system in accordance with the present invention.

Referring now to FIG. 9 which represents another exemplary embodiment of the present invention, a CATV system 900 is shown which includes a service provider node 905, a local device 910, a display 915 and a wireless GUI controller 920. The service provider node 905 may be a multiple system cable operator (MSO). The local device 910 may be a set-top box in communication with a remote server maintained by the service provider node 905 and the display 915, which may be a television. Local device 910 includes a processor 925, a first memory location 930, a second memory location 935 and a third memory location 940. EPG data is transmitted from the service provider node 905 (e.g., headend) to the processor 925 within local device 910. The EPG data is displayed, in whole or in part, on display 915. Processor 925 parses through the EPG data received and creates a table of hidden supplemental data that would normally have to be displayed in such a small font that it would be almost impossible for a viewer to see the data at a reasonable distance from the display 915. Image portion selections may be made directly via GUI controller 920 by utilizing a wireless pointing capability that may be built into an infrared (IR) remote control, wireless mouse, Web pad, or the like. Image data associated with the selected image portion is stored in the first memory location 930. Image data associated with the remaining displayed image portion(s) is stored in the second memory location 935. A search is then performed on the third memory location 940 to determine if there is hidden supplemental data associated with the selected image portion. The first, second and third memory locations, 930, 935, and 940, can reside in processor 925 or in another processor that communicates with processor 925.

FIG. 10 represents another exemplary embodiment of the present invention for which a table 1000 is used to determine whether there is hidden supplemental data associated with a selected image portion. Each selectable image portion is assigned an identification parameter 1005 (in this example: IDs 1, 2, 3 and 4 have been assigned). When a particular image portion is selected by a user who views data displayed in the selected image portion 1010 (e.g., "I Love Lucy"), the table 1000 residing in memory location 940 is searched and, if found, hidden supplemental data 1015 that correlates to the selected image portion (e.g., Episode #27 "The Kleptomaniac"—Ricky Discovers a Large Amount of Cash in Lucy's Purse) is displayed in an enlarged window that was not displayed in the selectable image portion window, along with the data originally displayed in the selected image portion window.

FIG. 11 represents another exemplary embodiment which incorporates the features of the present invention into a subscriber's local device. A service provider 1105 (e.g., MSO) offers an enlargement feature to a user of a local device 1110 (e.g., a set-top box). The offer is presented by displaying the offer on a television 1115 via the local device 1110. The subscriber is given the opportunity to accept the offer by pressing one or more buttons on the local device 1110, a wireless GUI, or by placing a telephone call to the service provider or a third party representative. Upon acceptance of the offer by the subscriber and processing by the service provider, an enlargement feature application program is downloaded from the service provider 1105 to the local device 1110 and stored in a memory and/or processor within the local device 1110.

FIGS. 12A–12D represent another exemplary embodiment of the present invention which is used to select an image portion for enlargement.

As shown in FIG. 12A, the selection of a particular image portion for enlargement may be implemented by the user selecting one of a plurality of image portions P1–P25 contained by an original image viewed on display 1200. The selection of region 1205 in the GUI may be accomplished in a number of ways, such as by superimposing a floating plane region on one of image portions P1–P25, or by utilizing a wireless pointing capability that may be built into an infrared (IR) remote control, wireless mouse, Web pad, or the like.

FIGS. 12B–12D illustrate that the location of the selectable region changes in accordance with which portion P1–P25 of the original image is selected for enlargement.

As shown in FIG. 12B, an enlarged image 1205' of selected image portion P13 is viewed on display 1200'. The image portions P1–P12, P14 and P16–P20 that were immediately adjacent to selected image portion P13 prior to being enlarged, are positioned to surround the enlarged image portion viewed on display 1200' such that these adjacent image portions retain their relative positions when compared to the original image. Image portions P15 and P21–P25 are hidden from view.

As shown in FIG. 12C, when the selectable region is moved from selected image portion P13 to image portion P12, an enlarged image 1210 of selected image portion P12 is viewed on display 1200". The image portions P1–P11, P13, P14 and P16–P20 that were immediately adjacent to selected image portion P12 prior to being enlarged, are positioned to surround the enlarged image portion viewed on display 1200" such that these adjacent image portions retain their relative positions when compared to the original image. Image portions P15 and P21–P25 are again hidden from view.

As shown in FIG. 12D, when the selectable region is moved from selected image portion P12 to image portion P17, an enlarged image 1215 of selected image portion P17 is viewed on display 1200'''. In this example, the image portions P6–P16, P18, P19 and P21–P25 that were immediately adjacent to selected image portion P17 prior to being enlarged, are positioned to surround the enlarged image portion viewed on display 1200''' such that these adjacent image portions retain their relative positions when compared to the original image. Image portions P1–P5 and P20 are hidden from view.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for enlarging a first portion of a first image, the apparatus comprising:
   a first memory location capable of storing the first portion of the first image;
   a second memory location capable of storing a second portion of the first image wherein the first portion of the first image and the second portion of the first image have a first orientation relative to each other in the first image;
   a processor capable of operating in accordance with instructions wherein the processor retrieves the first portion from the first memory location, retrieves the second portion from the second memory location and generates a second image comprising an enlarged first portion and a second portion wherein the second portion in the second image is adjacent to and distinct from the enlarged first portion and wherein the enlarged first portion of the second image and the second portion of the second image have a second orientation relative to each other that is different from the first orientation.

2. The apparatus of claim 1 further comprising:
   a display that displays the first image and the second image.

3. The apparatus of claim 1 further comprising:
   a wireless remote device used to select the first portion of the first image.

4. The apparatus of claim further comprising:
   a third memory location capable of storing a table that correlates supplemental data with the first portion of the first image wherein the supplemental data is not displayed in the first image.

5. The apparatus of claim 4 wherein the enlarged first portion of the second image includes some of the supplemental data associated with the first portion of the first image.

6. A method for displaying image data comprising:
   displaying a first image comprised of a first portion and a second portion wherein the first portion and the second portion have a first orientation relative to each other in the first image;
   receiving a selection for enlargement of the first portion; and
   displaying a second image comprised of an enlarged image of the first portion and the second portion adjacent to and distinct from the enlarged image of the first portion wherein the enlarged image of the first portion and the second portion have a second orientation relative to each other different in the second image from the first orientation.

7. The method of claim 6 further comprising:
   retrieving supplemental data associated with the first portion that is not displayed in the first image; and
   displaying the supplemental data along with the enlarged image of the first portion adjacent to and distinct from the second portion.

* * * * *